US012314072B2

(12) United States Patent
Wu

(10) Patent No.: US 12,314,072 B2
(45) Date of Patent: May 27, 2025

(54) VOLTAGE GENERATING DEVICE

(71) Applicant: Winbond Electronics Corp., Taichung (TW)

(72) Inventor: Chen-Yu Wu, Taichung (TW)

(73) Assignee: Windbond Electronics Corp., Taichung (TW)

( * ) Notice: Subject to any disclaimer, the term of this patent is extended or adjusted under 35 U.S.C. 154(b) by 288 days.

(21) Appl. No.: 18/082,523

(22) Filed: Dec. 15, 2022

(65) Prior Publication Data

US 2024/0201720 A1 Jun. 20, 2024

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC ................................. G05F 1/565; G05F 1/575
USPC .......................................................... 323/280
See application file for complete search history.

(56) References Cited

U.S. PATENT DOCUMENTS

2009/0039921 A1* 2/2009 Ohira ............... G01R 19/16542 327/64
2014/0266118 A1* 9/2014 Chern ................... H02M 3/156 323/283
2016/0087602 A1* 3/2016 Adams ...................... G05F 3/04 327/532
2017/0102724 A1* 4/2017 Petenyi ................... G05F 1/575
2020/0409402 A1* 12/2020 Chang ..................... G05F 1/575

* cited by examiner

*Primary Examiner* — Yemane Mehari
(74) *Attorney, Agent, or Firm* — JCIPRNET

(57) ABSTRACT

A voltage generating device includes a low-dropout voltage regulator and a control signal generator. The low-dropout voltage regulator provides an output voltage to a power distribution network. The low-dropout voltage regulator has a feedback circuit. The feedback circuit divides the output voltage to generate a feedback voltage according to a voltage dividing ratio, and the feedback circuit sets the voltage dividing ratio according to multiple control signals. The control signal generator is coupled to the feedback circuit and the power distribution network, and generates the control signals by comparing a sensing voltage at a reference terminal of the power distribution network with multiple threshold voltages.

11 Claims, 6 Drawing Sheets

VOLTAGE GENERATING DEVICE

BACKGROUND

Technical Field

The disclosure relates to a voltage generating device, and more particularly, to a voltage generating device capable of compensating for load conditions and power grids.

Description of Related Art

In the conventional technology, low-dropout voltage regulators are often used to provide the output voltage to the power distribution network, and to enable multiple circuits connected to the power distribution network to operate. However, due to the IR-drop caused by the internal resistance in the power distribution network, the voltage on the power distribution network may change greatly under different degrees of load extraction, which may cause circuits on the power distribution network to malfunction. Therefore, how to provide a suitable voltage generating device that may reliably provide a stable voltage to the power distribution network is an important issue for those skilled in the art.

SUMMARY

The voltage generating device according to the disclosure includes a low-dropout voltage regulator and a control signal generator. The low-dropout voltage regulator provides an output voltage to a power distribution network. The low-dropout voltage regulator has a feedback circuit. The feedback circuit divides the output voltage to generate a feedback voltage according to a voltage dividing ratio, and the feedback circuit sets the voltage dividing ratio according to multiple control signals. The control signal generator is coupled to the feedback circuit and the power distribution network, and generates the control signals by comparing a sensing voltage on a reference end of the power distribution network with multiple threshold voltages.

Based on the above, the voltage generating device of the disclosure may adjust the voltage dividing ratio of the feedback circuit in the low-dropout voltage regulator for generating the output voltage according to the sensing voltage at the reference terminal of the power distribution network. In this way, the output voltage of the voltage generating device may dynamically adjust the voltage value of the output voltage according to the load pumping state of the power distribution network, thereby effectively improving the stability of the output voltage and maintaining the normal operation of the system.

DESCRIPTION OF EMBODIMENTS

Figure 1:
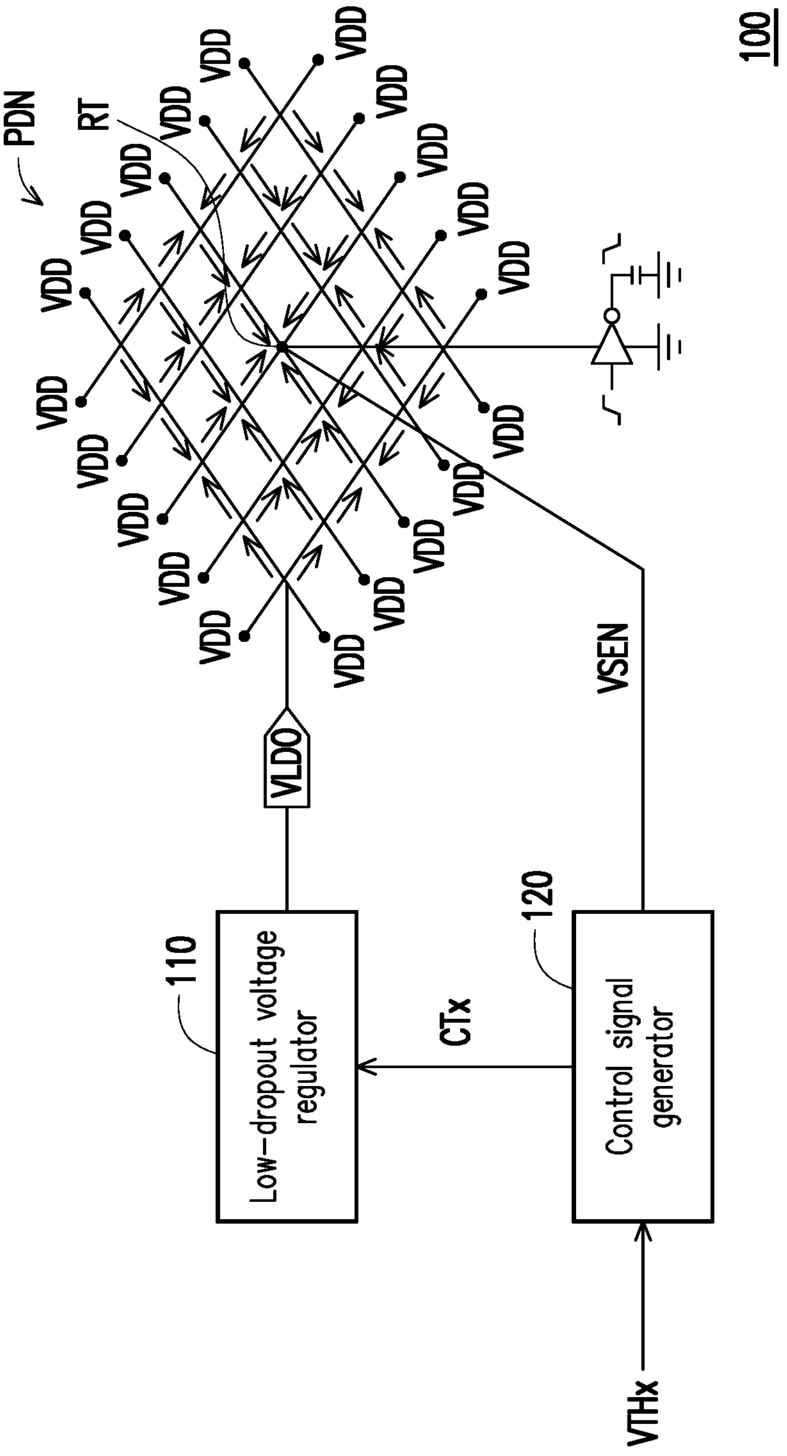
FIG. 1 is a schematic diagram of a voltage generating device according to an embodiment of the disclosure.

FIG. 1 is a schematic diagram of a voltage generating device according to an embodiment of the disclosure. Referring to FIG. 1, a voltage generating device 100 is coupled to a power distribution network PDN, and is configured to provide a generated output voltage VLDO to the power distribution network PDN to provide its power supply VDD. The voltage generating device 100 includes a low-dropout voltage regulator 110 and a control signal generator 120. The control signal generator 120 is coupled to the low-dropout voltage regulator 110 and the power distribution network PDN. The low-dropout voltage regulator 110 has a feedback circuit (not shown). The feedback circuit is configured to divide the output voltage VLDO according to a voltage dividing ratio and generate a feedback voltage, and the low-dropout voltage regulator 110 may adjust the voltage value of the generated output voltage VLDO according to a feedback voltage dividing ratio.

In this embodiment, the control signal generator 120 is coupled to a reference terminal RT of the power distribution network PDN, and receives a sensing voltage VSEN at the reference terminal RT of the power distribution network PDN. The control signal generator 120 receives multiple threshold voltages VTHx and compares the sensing voltage VSEN with the multiple threshold voltages VTHx to generate multiple control signals CTx respectively. Further, the control signal generator 120 may provide the control signal CTx to the low-dropout voltage regulator 110. The low-dropout voltage regulator 110 may adjust the voltage dividing ratio provided by the feedback circuit according to the control signal CTx.

In detail, when the power distribution network PDN is changed from a light load to a heavy load, the sensing voltage VSEN at the reference terminal RT of the power distribution network PDN decreases correspondingly. The control signal generator 120 may generate the control signal CTx through the comparison result between the sensing voltage VSEN and the threshold voltage VTHx, and adjust the voltage dividing ratio provided by the feedback circuit through the control signal CTx to make the voltage value of the output voltage VLDO increase to respond to the load change on the power distribution network PDN. In contrast, when the power distribution network PDN is changed from a heavy load to a light load, the sensing voltage VSEN at the reference terminal RT of the power distribution network PDN increases correspondingly. The control signal generator 120 may generate the control signal CTx through the comparison result between the sensing voltage VSEN and the threshold voltage VTHx, and adjust the voltage dividing ratio provided by the feedback circuit through the control signal CTx to make the voltage value of the output voltage VLDO decrease to respond to the load change on the power distribution network PDN.

In addition, the threshold voltage VTHx in the embodiments of the disclosure may be set according to the change range of the sensing voltage VSEN that may be generated due to the load change of the power distribution network PDN. Furthermore, the reference terminal RT of the power distribution network PDN may be set at a terminal with the heaviest load on the power distribution network PDN.

Figure 2:
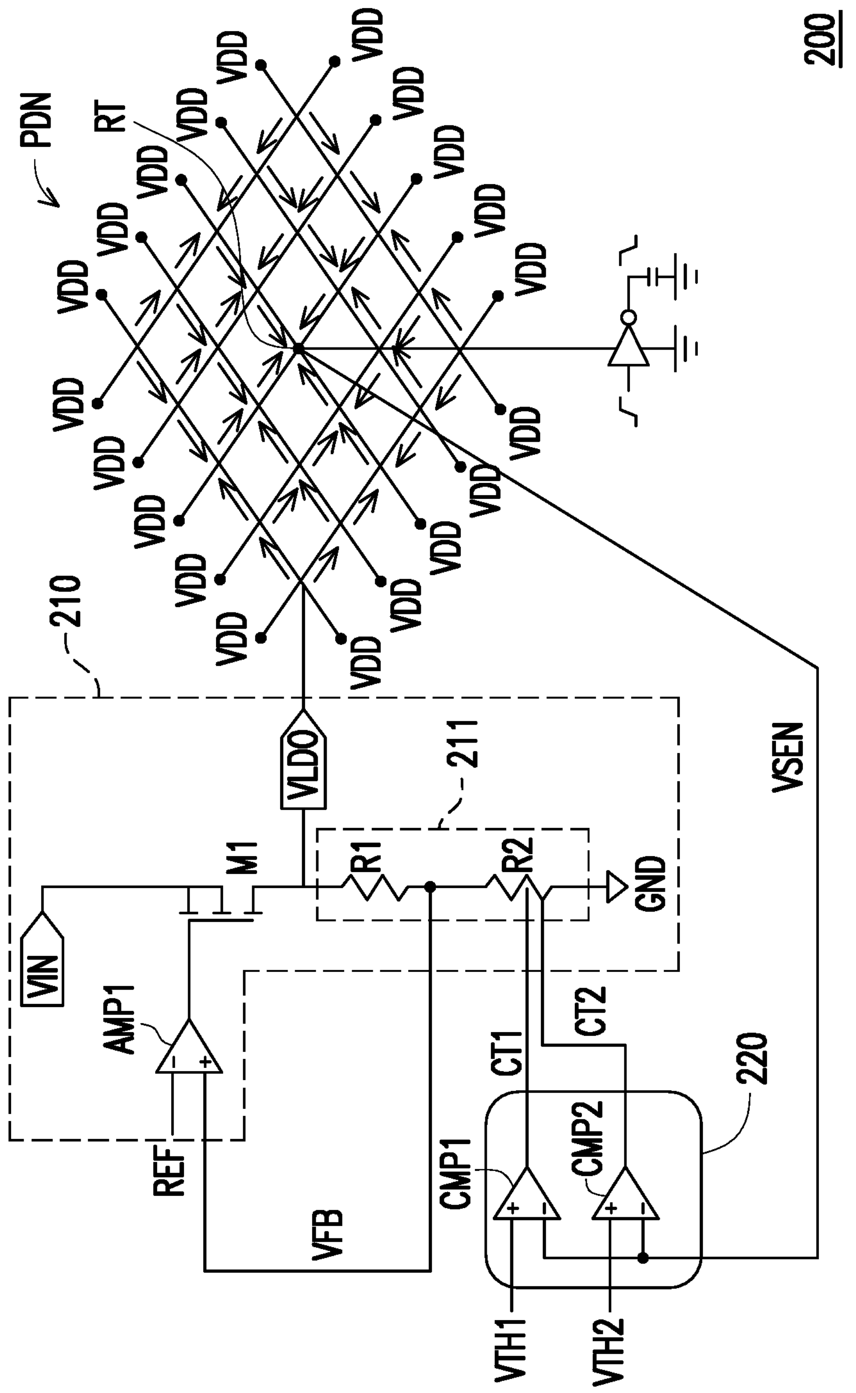
FIG. 2 and FIG. 3 are circuit diagrams of a voltage generating device according to another embodiment of the disclosure.

FIG. 2 is a circuit diagram of a voltage generating device according to another embodiment of the disclosure. Referring to FIG. 2, a voltage generating device 200 is coupled to a power distribution network PDN, and is configured to provide a generated output voltage VLDO to the power distribution network PDN. The voltage generating device 200 includes a low-dropout voltage regulator 210 and a control signal generator 220. The low-dropout voltage regulator 210 includes an amplifier AMP1, a power transistor M1 and a feedback circuit 211. The feedback circuit 211 includes resistors R1 and R2. The resistors R1 and R2 are sequentially coupled in series between the transistor M1 and a reference ground terminal GND. The feedback circuit 211 is configured to divide the output voltage VLDO to generate a feedback voltage VFB.

A negative input terminal of the amplifier AMP1 receives a reference voltage REF, and a positive input terminal of the amplifier AMP1 receives the feedback voltage VFB. An output terminal of the amplifier AMP1 is coupled to a control terminal of the transistor M1. In addition, a first terminal of the transistor M1 receives an input voltage VIN, and a second terminal of the transistor M1 serves as an output terminal of the voltage generating device 200 for generating the output voltage VLDO and is coupled to the feedback circuit 211.

In addition, the resistor R2 is a variable resistor. The resistance value of the resistor R2 may be adjusted according to control signals CT1 and CT2. The control signals CT1 and CT2 are generated by the control signal generator 220. The control signal generator 220 includes comparators CMP1 and CMP2. The comparator CMP1 compares a threshold voltage VTH1 with the sensing voltage VSEN at the reference terminal RT of the power distribution network PDN and generates the control signal CT1. The comparator CMP2 compares a threshold voltage VTH2 with the sensing voltage VSEN at the reference terminal RT of the power distribution network PDN and generates the control signal CT2. A case where the threshold voltage VTH1 is greater than VTH2 is taken as an example. When the sensing voltage VSEN is greater than the threshold voltage VTH1, the control signal generator 220 may generate both of the control signals CT1 and CT2 as disabled, so that the resistor R2 is equal to a first resistor. When the sensing voltage VSEN is between the threshold voltages VTH1 and VTH2, the control signal generator 220 may generate the control signals CT1 and CT2 as enabled and disabled, respectively, so that the resistor R2 is equal to a second resistor. When the sensing voltage VSEN is less than the threshold voltage VTH2, the control signal generator 220 may generate both of the control signals CT1 and CT2 as enabled, so that the resistor R2 is equal to a third resistor. The first resistor is greater than the second resistor, and the second resistor is greater than the third resistor.

In addition, the control signal generator 220 may include two or more comparators, and generate two or more control signals accordingly. In this way, the resistor R2 may be adjusted in multiple stages to improve the resolution of the adjustment of the voltage dividing ratio.

From the above description, it may be seen that the output voltage VLDO generated by the voltage generating device 200 may be adaptively adjusted according to the load condition of the power distribution network PDN, so as to reduce the unsettling time of the output voltage VLDO caused by the change of the load condition and to improve the working stability of the system.

Figure 3:
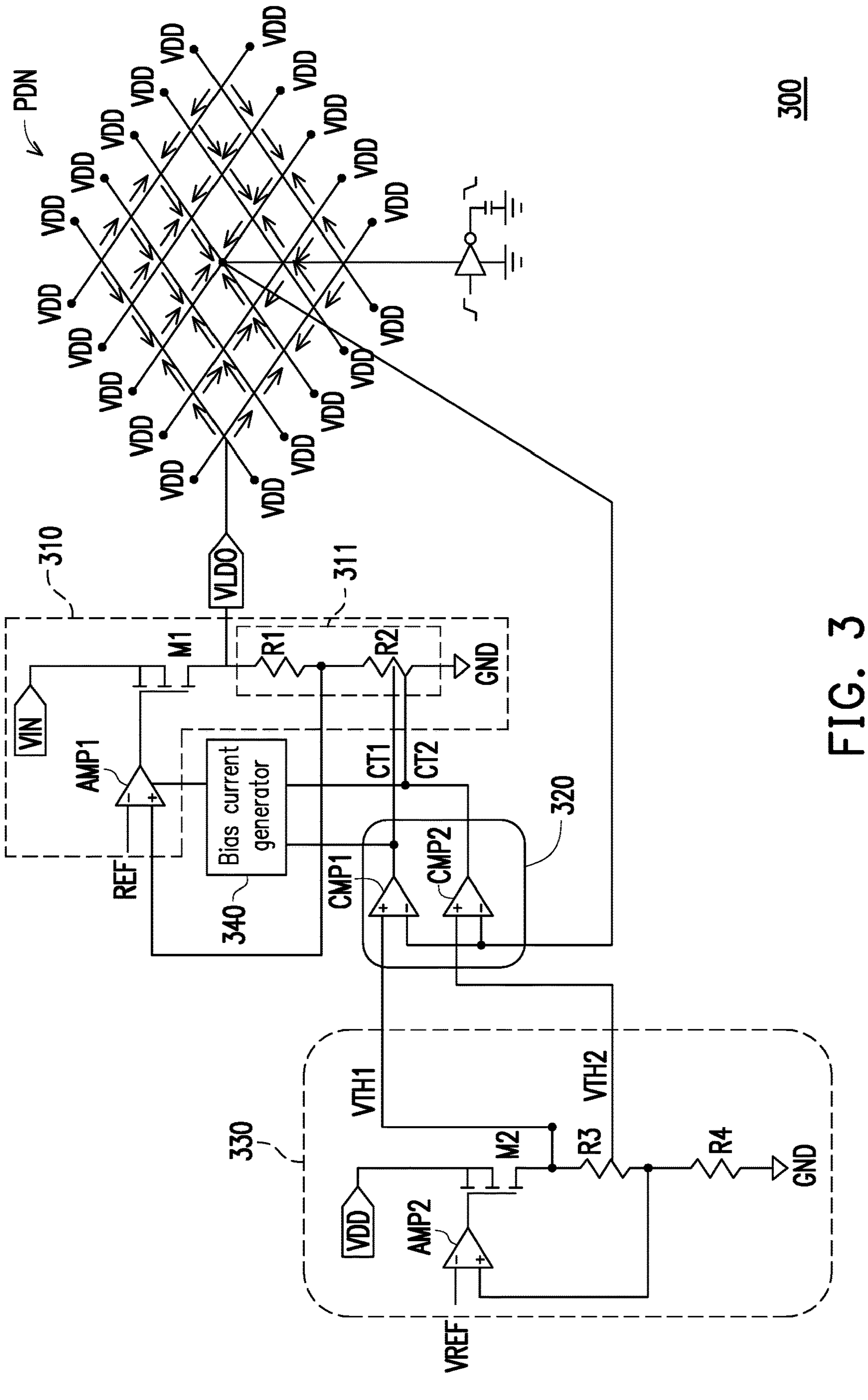

FIG. 3 is a circuit diagram of a voltage generating device according to another embodiment of the disclosure. Referring to FIG. 3, a voltage generating device 300 is coupled to a power distribution network PDN, and is configured to provide a generated output voltage VLDO to the power distribution network PDN. The voltage generating device 300 includes a low-dropout voltage regulator 310, a control signal generator 320, a threshold voltage generator 330 and a bias current generator 340. The implementation details of the low-dropout voltage regulator 310 and the control signal generator 320 are similar to those of the low-dropout voltage regulator 210 and the control signal generator 220 in the foregoing embodiment, and are not repeated here.

In this embodiment, the threshold voltage generator 330 includes an amplifier AMP2, a power transistor M2, and resistors R3 and R4. The amplifier AMP2, the power transistor M2, and the resistors R3 and R4 configure another low-dropout voltage regulator. A negative input terminal of the amplifier AMP2 receives a reference voltage VREF; a positive input terminal of the amplifier AMP2 is coupled to a terminal where the resistors R3 and R4 are coupled; an output terminal of the amplifier AMP2 is coupled to a control terminal of the power transistor M2. A first terminal of the power transistor M2 receives the input voltage VIN, and a second terminal of the power transistor M2 is coupled to a first terminal of the resistor R3. The resistors R3 and R4 are sequentially connected in series between the second terminal of the power transistor M2 and the reference ground terminal GND. The reference voltage VREF may be equal to the reference voltage REF.

In this embodiment, a target voltage VCORE of the sensing voltage VSEN at the reference terminal RT of the power distribution network PDN is set so that on the premise that the resistor R3 is equal to the resistor R1, the target voltage $VCORE=VREF\times(1+/R1/R4)$. When there is a load current IL at the reference terminal RT of the power distribution network PDN, the relationship between the target voltage VCORE and the output voltage VLDO of the voltage generating device 300 may be expressed as $VCORE=VLDO-IL\times Req$, where Req is equal to the equal resistance between the output terminal of the voltage generating device 300 and the reference terminal RT.

In further analysis, the target voltage VCORE may be equal to $VREF\times(1+R1/R4)-IL\times Req$, so it may be obtained that $R2=VREF\times R1\times R4/VREF\times R1+IL\times Req\times R4$. In this way, the resistor R2 may be adjusted according to the change of the load current IL.

In addition, when the load current IL is equal to 0, the resistors R2 and R4 are equal.

In addition, different from the foregoing embodiments, the voltage generating device 300 of this embodiment is further provided with the bias current generator 340. The bias current generator 340 is coupled to the amplifier AMP1 and the control signal generator 320. The bias current generator 340 receives the control signals CT1 and CT2 generated by the control signal generator 320, and provides a bias current to the amplifier AMP1 according to the control signals CT1 and CT2. The magnitude of the bias current provided by the bias current generator 340 may be positively related to the number of the control signals CT1 and CT2 that are enabled.

In addition, when a large load change occurs on the power distribution network PDN, the bias current generator 340 may provide a relatively large bias current to the amplifier AMP1, so that the amplifier AMP1 may improve the response speed, so that the generated output voltage VLDO tends to a settled state, which improves the stability of the system.

Figure 4:
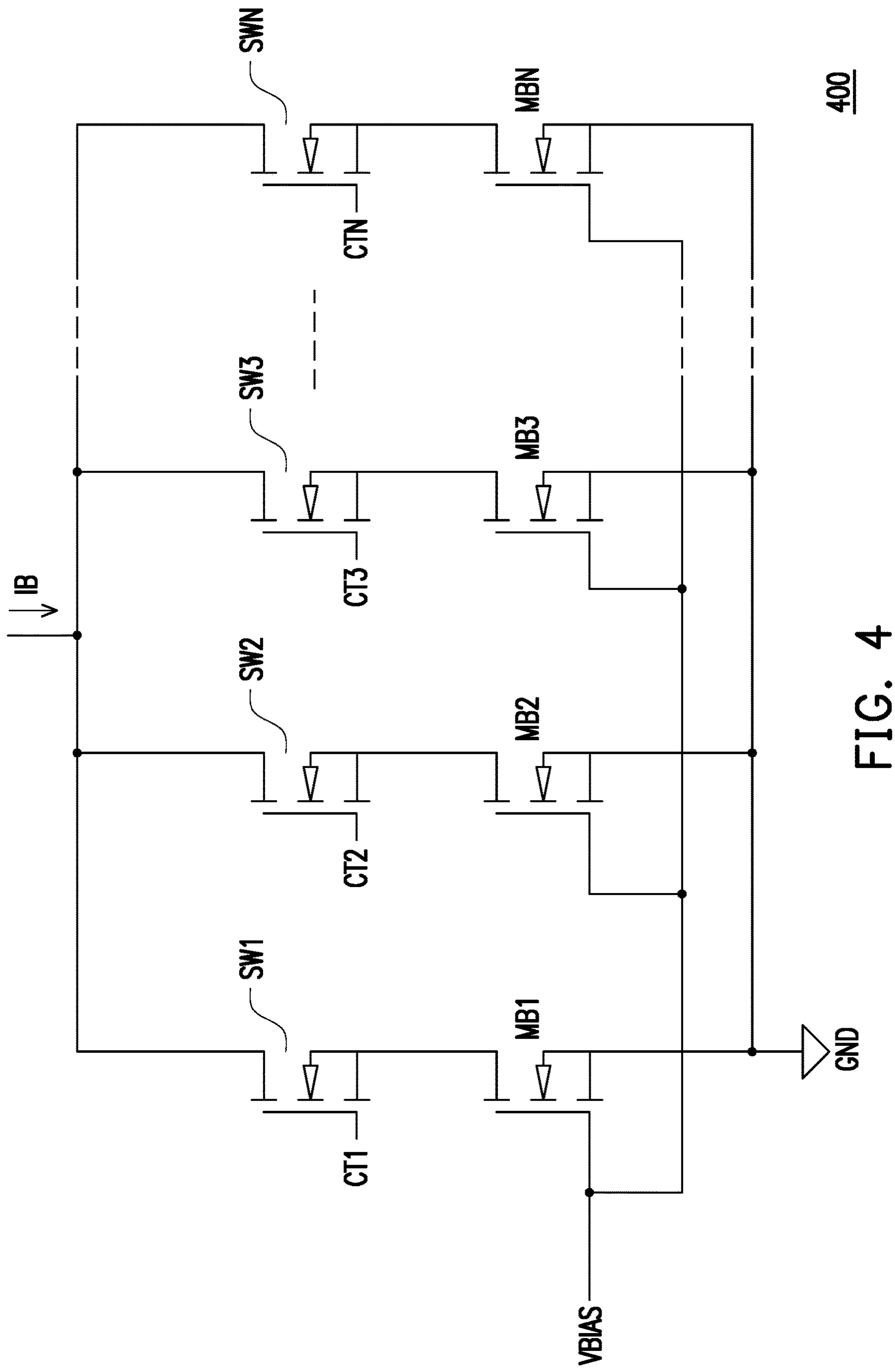
FIG. 4 is a schematic diagram of an implementation of a bias current generator according to an embodiment of the disclosure.

FIG. 4 is a schematic diagram of an implementation of a bias current generator according to an embodiment of the disclosure. Referring to FIG. 4, the bias current generator 400 includes multiple switches SW1 to SWN configured by transistors, and multiple current sources configured by transistors MB1 to MBN. The switches SW1 to SWN are respectively coupled in series with the transistors MB1 to MBN. The switches SW1 to SWN are connected in parallel with each other, and the transistors MB1 to MBN are also connected in parallel with each other. The switches SW1 to SWN receive the control signals CT1 to CTN, respectively. The switches SW1 to SWN are turned on or off according to the corresponding control signals CT1 to CTN. Taking the control signal CT1 as an example, when the control signal CT1 is enabled, the corresponding switch SW1 is turned on. On the contrary, when the control signal CT1 is disabled, the corresponding switch SW1 is turned off. The control signals CT1 to CTN may be provided by the control signal generator 320 as shown in FIG. 3. The number of control signals CT1 to CTN may be two or more, which is not particularly limited.

The control terminals of the transistors MB1 to MBN receive a same bias voltage VBIAS. When the corresponding switches SW1 to SWN are turned on, the current source formed by each transistor MB1 to MBN may provide a bias current IB according to the bias voltage VBIAS. The larger the number of switches SW1 to SWN that are turned on, the larger the bias current IB provided by the bias current generator 400.

The transistors MB1 to MBN may have the same channel aspect ratio, or may have different channel aspect ratios, which are not particularly limited. For example, the channel aspect ratio of the transistors MB1 to MBN may be $1:2: \ldots :2^{N-1}$.

Figure 5A:
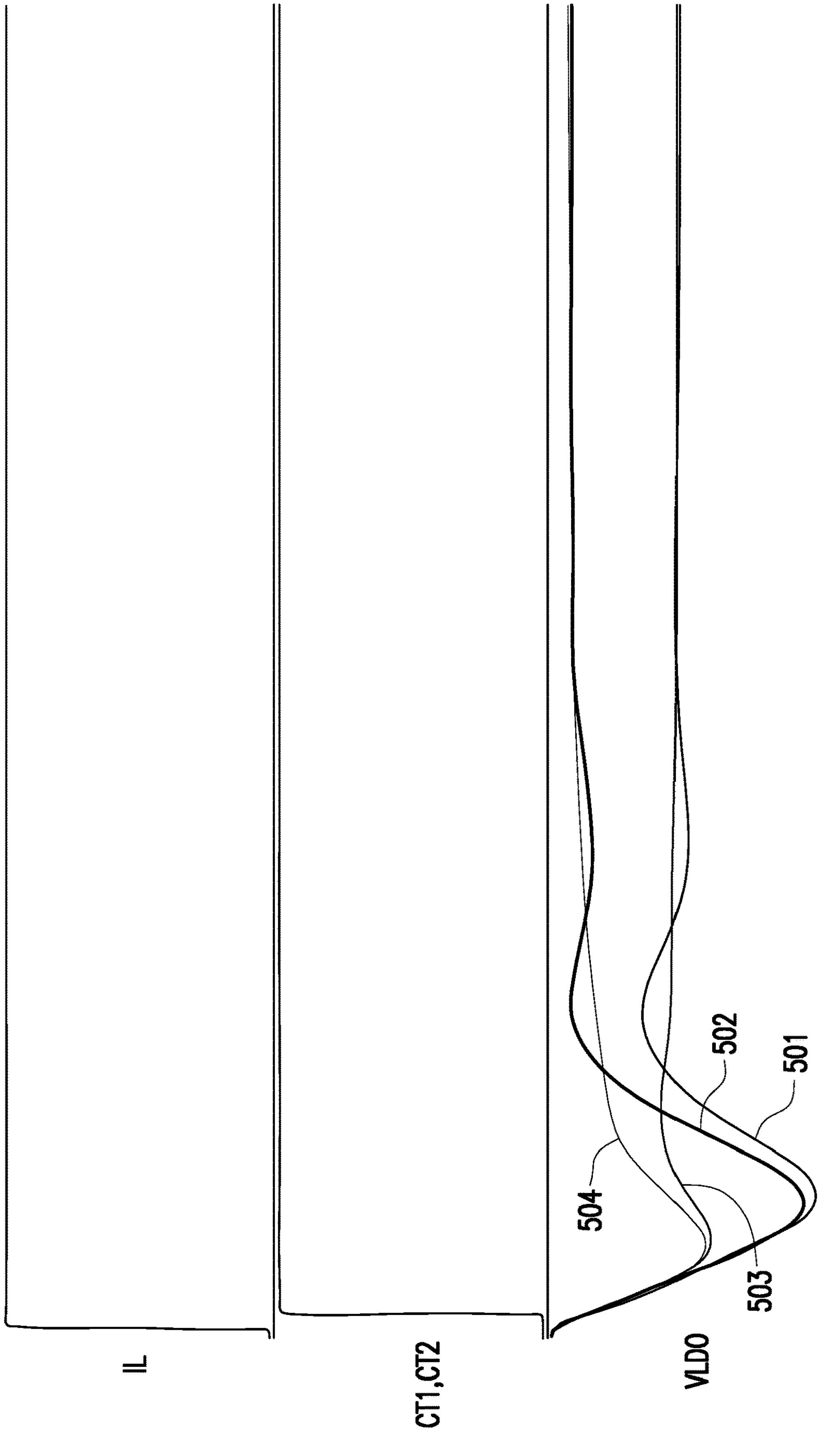
FIG. 5A and FIG. 5B are respectively an action waveform diagram of the voltage generating device according to an embodiment of the disclosure under different load conditions.
Figure 5B:
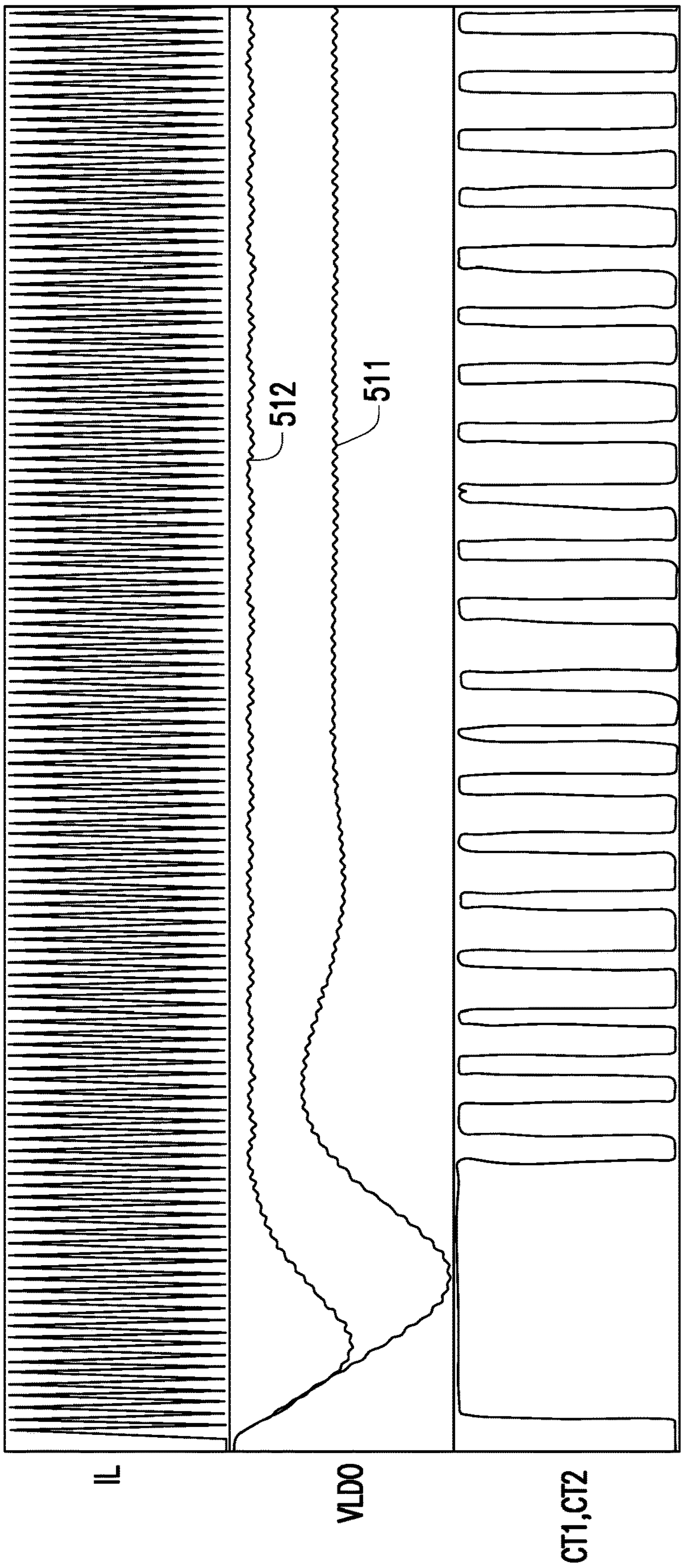

Please refer to FIG. 3, FIG. 5A and FIG. 5B for the following description. FIG. 5A and FIG. 5B are respectively an action waveform diagram of the voltage generating device according to an embodiment of the disclosure under different load conditions. In FIG. 5A, the waveform of the load current IL may be a unit step. Based on a sufficiently large current value of the load current IL, the comparators CMP1 and CMP2 may simultaneously generate the control signals CT1 and CT2 that are enabled. Correspondingly, the output voltage VLDO that may be generated by a conventional low-dropout voltage regulator without compensation may be a voltage waveform 501. The voltage waveform 501 has a relatively long settling time, the amplitudes of the overshoot and undershoot of the voltage waveform 501 are the highest, and the final settled voltage value of the voltage waveform 501 is also lower than the target voltage.

In addition, by performing only the compensation operation of adjusting the voltage dividing ratio of the feedback circuit 311, the output voltage VLDO that may be generated by the voltage generating device 300 may be a voltage waveform 502. It may be clearly found that through the compensation operation of adjusting the voltage dividing ratio of the feedback circuit 311, the final settled voltage value of the voltage waveform 502 of the output voltage VLDO may be close to the target voltage.

By performing only the compensation operation of the bias current generator 340, the output voltage VLDO that may be generated by the voltage generating device 300 may be a voltage waveform 503. The voltage waveform 503 may have a relatively short settling time, and the amplitudes of its overshoot and undershoot may be effectively reduced.

By performing both the compensation operation of adjusting the voltage dividing ratio of the feedback circuit 311 and the compensation operation of the bias current generator 340, the output voltage VLDO that may be generated by the voltage generating device 300 may be a voltage waveform 504. The voltage waveform 504 may have a relatively short settling time, and the amplitudes of its overshoot and undershoot may be effectively reduced, and the final settled voltage value of the voltage waveform 504 may be close to the target voltage.

In FIG. 5B, the waveform of the load current IL may be a continuous pulse wave. Correspondingly, the comparators CMP1 and CMP2 may simultaneously generate the control signals CT1 and CT2 that are alternately enabled and disabled. The output voltage VLDO that may be generated by a conventional low-dropout voltage regulator without compensation may be a voltage waveform 511. The voltage waveform 511 has a relatively long settling time; the amplitudes of the overshoot and undershoot of the voltage waveform 511 are higher; and the final settled voltage value of the voltage waveform 511 is also lower than the target voltage. The voltage generating device 300 of the embodiment of FIG. 3 may generate a voltage waveform that has a relatively short settling time; and the voltage waveform 512 of the embodiment has relatively low overshoot and undershoot amplitude; and the final settled voltage value is also close to the target voltage.

To sum up, the voltage generating device of the disclosure receives the sensing voltage on the power distribution network, and compares the sensing voltage with multiple threshold voltages to adjust the voltage dividing ratio of the feedback circuit of the low-dropout voltage regulator. According to the magnitude of the load, the voltage generating device may adaptively adjust the voltage value of the generated output voltage, which may effectively improve the stability of the output voltage and maintain the normal operation of the system.

What is claimed is:

1. A voltage generating device, comprising:

a low-dropout voltage regulator that provides an output voltage to a power distribution network, wherein the low-dropout voltage regulator comprises a feedback circuit, and the feedback circuit divides the output voltage to generate a feedback voltage according to a voltage dividing ratio, wherein the feedback circuit sets the voltage dividing ratio according to a plurality of control signals; and a control signal generator that is coupled to the feedback circuit and the power distribution network, and generates the control signals by comparing a sensing voltage at a reference terminal of the power distribution network with a plurality of threshold voltages, wherein the feedback circuit comprises a first resistor and a second resistor, and the first resistor and the second resistor are sequentially connected in series between an output terminal of the voltage generating device and a reference ground terminal, the second resistor is a variable resistor, and a resistance value of the second resistor is adjusted according to the control signals, wherein the control signal generator comprises a first comparator and a second comparator, the first comparator compares the sensing voltage with a first threshold voltage to generate a first control signal, and the second comparator compares the sensing voltage with a second threshold voltage to generate a second control signal, wherein the first threshold voltage and the second threshold voltage are different.

2. The voltage generating device according to claim 1, wherein the first comparator enables the first control signal in response to the sensing voltage being less than the first threshold voltage, and the second comparator enables the second control signal in response to the sensing voltage being less than the second threshold voltage.

3. The voltage generating device according to claim 1, wherein the reference terminal is a terminal with a heaviest load on the power distribution network.

4. The voltage generating device according to claim 1, wherein the low-dropout voltage regulator further comprises:

an amplifier that has a negative input terminal to receive a reference voltage and a positive input terminal to receive the feedback voltage; and a power transistor that has a first terminal to receive an input voltage, a control terminal coupled to an output terminal of the amplifier, and a second terminal coupled to the feedback circuit for generating the output voltage.

5. The voltage generating device according to claim 4, further comprising:

a bias current generator that is coupled to the power transistor and the control signal generator, and adjusts a current value of a bias current provided to the power transistor according to the control signals.

6. The voltage generating device according to claim 5, wherein the bias current generator comprises:

a plurality of switches, wherein first terminals of the switches are commonly coupled to the amplifier, and each of the switches is controlled by each of the control signals to be turned on or off; and a plurality of current sources respectively coupled to the switches in series to respectively generate a plurality of sub-bias currents according to a bias voltage.

7. The voltage generating device according to claim 6, wherein each of the current sources comprises:

a transistor coupled in series between each corresponding switch and a reference ground terminal, wherein the transistor generates each sub-bias current according to the bias voltage in response to the corresponding switch being turned on.

8. The voltage generating device according to claim 1, further comprising:

a threshold voltage generator configured to generate a first threshold voltage and to generate at least a second threshold voltage according to a divided voltage of the first threshold voltage.

9. The voltage generating device according to claim 8, wherein the threshold voltage generator is a low-dropout voltage regulator.

10. A voltage generating device, comprising:

a low-dropout voltage regulator that provides an output voltage to a power distribution network, wherein the low-dropout voltage regulator comprises a feedback circuit, and the feedback circuit divides the output voltage to generate a feedback voltage according to a voltage dividing ratio, wherein the feedback circuit sets the voltage dividing ratio according to a plurality of control signals;

a control signal generator that is coupled to the feedback circuit and the power distribution network, and generates the control signals by comparing a sensing voltage at a reference terminal of the power distribution network with a plurality of threshold voltages, wherein the low-dropout voltage regulator further comprises:

an amplifier that has a negative input terminal to receive a reference voltage and a positive input terminal to receive the feedback voltage; and a power transistor that has a first terminal to receive an input voltage, a control terminal coupled to an output terminal of the amplifier, and a second terminal coupled to the feedback circuit for generating the output voltage; and a bias current generator that is coupled to the power transistor and the control signal generator, and adjusts a current value of a bias current provided to the power transistor according to the control signals, wherein the bias current generator comprises:

a plurality of switches, wherein first terminals of the switches are commonly coupled to the amplifier, and each of the switches is controlled by each of the control signals to be turned on or off; and a plurality of current sources respectively coupled to the switches in series to respectively generate a plurality of sub-bias currents according to a bias voltage.

11. The voltage generating device according to claim 10, wherein each of the current sources comprises:

a transistor coupled in series between each corresponding switch and a reference ground terminal, wherein the transistor generates each sub-bias current according to the bias voltage in response to the corresponding switch being turned on.

* * * * *